United States Patent [19]

Takahara et al.

[11] Patent Number: 5,142,937
[45] Date of Patent: Sep. 1, 1992

[54] DRIVING APPARATUS WITH A SPEED CHANGER FOR A BICYCLE

[75] Inventors: Toshiyuki Takahara; Akira Takami, both of Himeji, Japan

[73] Assignee: Mitsubishi Denki K.K., Tokyo, Japan

[21] Appl. No.: 572,654

[22] Filed: Aug. 27, 1990

[30] Foreign Application Priority Data

Aug. 28, 1989 [JP] Japan ............................. 1-100295[U]
Jul. 25, 1990 [JP] Japan ............................. 2-79401[U]

[51] Int. Cl.⁵ .......................... G05G 1/14; F16H 55/17
[52] U.S. Cl. ...................................... 74/594.3; 74/437
[58] Field of Search ................. 74/437, 393, 422, 462, 74/606 R, 594.1–594.3; 475/16, 17, 904, 438

[56] References Cited

U.S. PATENT DOCUMENTS

| | | | |
|---|---|---|---|
| 515,421 | 2/1894 | Chadbourne | 74/594.3 |
| 589,728 | 9/1897 | James | 74/594.3 |
| 613,456 | 11/1898 | Meier | 74/594.3 |
| 1,126,947 | 2/1915 | Boyd | 74/594.3 |
| 4,036,073 | 7/1977 | Kitano | 74/437 X |
| 4,685,348 | 8/1987 | Takami | 74/437 |
| 4,732,054 | 3/1988 | Takamiya et al. | 74/750 B |
| 4,765,195 | 8/1988 | Takami | 74/113 |
| 4,781,663 | 11/1988 | Reswick | 474/49 |
| 4,865,145 | 9/1989 | Ijiri et al. | 180/791 |
| 4,912,993 | 4/1990 | Konishi et al. | 74/437 X |

FOREIGN PATENT DOCUMENTS

| | | | |
|---|---|---|---|
| 3404562 | 8/1985 | Fed. Rep. of Germany | 74/594.2 |
| 350848 | 6/1905 | France | 74/437 |
| 729781 | 7/1932 | France | 74/594.3 |
| 764011 | 5/1934 | France | 74/594.3 |
| 2-271143 | 11/1990 | Japan | 74/437 |
| 163751 | 11/1933 | Switzerland | |
| 205284 | 9/1939 | Switzerland | 74/594.2 |
| 3874 | of 1898 | United Kingdom | 74/594.3 |

Primary Examiner—Vinh T. Luong
Attorney, Agent, or Firm—Sughrue, Mion, Zinn, Macpeak & Seas

[57] ABSTRACT

A driving apparatus with a speed changer for a bicycle using a pair of non-circular gears for performing an exponential function angular velocity modulation for the speed changer. The driving apparatus is provided with a primary angular velocity modulating mechanism having a first non-circular gear fixed to a first rotary shaft receiving driving power and a second non-circular gear supported to a second rotary shaft, a secondary angular velocity modulating mechanism having the second non-circular gear and a third non-circular gear supported to a third rotary shaft generating driving power through a one-way clutch, and a spring for increasing a relative angle between the first and the third rotary shafts around the second rotary shaft. The driving apparatus performs an exponential function continuous increasing mode or an exponential function continuous decreasing mode using the primary and secondary angular velocity modulating mechanisms and transmits only one-directional rotation to the third rotary shaft (output shaft) through interposition of the one-way clutch. The driving apparatus continuously changes the angular velocity ratio of a rear wheel shaft with respect to a pedal crank shaft in a substantially stepless manner.

19 Claims, 14 Drawing Sheets

DRIVING APPARATUS WITH A SPEED CHANGER FOR A BICYCLE

BACKGROUND OF THE INVENTION

1. Field of the Invention

The present invention relates to a driving apparatus for a bicycle and, more specifically, to a speed changer using speed change means formed by combination of a pair of non-circular gears.

2. Description of Related Art

A conventionally widely used driving apparatus with a speed changer for a bicycle interposes an external speed changer between a crank sprocket and a rear wheel side sprocket. The external speed changer comprises a plurality of sprockets differing in number of teeth and concentrically fixed to be disposed at a crank gear or a rear freewheel so that a derailler shifts a driving chain axially with respect to the free-wheel to engage the chain with a different sprocket, thereby varying an angular velocity ratio.

Such driving apparatus with the speed changer has the problem in that the angular velocity ratio only changes stepwise and the speed change may not be smooth when subjected to a large torque.

SUMMARY OF THE INVENTION

An object of the present invention is to provide a driving apparatus with a speed changer for a bicycle which can change the angular velocity ratio substantially continuously in a stepless manner.

Another object of the present invention is to provide a driving apparatus with a speed changer for a bicycle, which smoothly performs of speed changing.

Still another object of the present invention is to provide a driving apparatus with a speed changer for a bicycle, provided with an automatic following-up function by a torque of angular velocity ratio.

Yet another object of the present invention is to provide a driving apparatus with a speed changer for a bicycle, wherein a pedal crank can smoothly be rotated without rapidly reducing resistance against treading in the vicinity of the dead points during one rotation of the crank.

The driving apparatus with the speed changer for the bicycle of the present invention is characterized by using at the speed changer a pair of non-circular gears to perform an exponential function angular velocity modulation, and provided with; primary angular velocity modulating means having a first non-circular gear fixed to a first rotary shaft of an input shaft and a second non-circular gear supported by a second rotary shaft; secondary angular velocity modulating means having the second non-circular gear and a third non-circular gear supported by a third rotary shaft of an output shaft through a one-way clutch, and a spring for biasing the modulating means to increase a relative angle and between the first rotary shaft and the third rotary shaft with respect to the second rotary shaft. A plurality of sets of such primary and secondary angular velocity modulating means are used respectively, the first non-circular gear of the respective sets shifts in phase to be fixed to the first non-circular gear at the respective sets.

Thus, the primary and secondary angular velocity modulating means are used to enable mode change for continuously exponentially increasing or decreasing the angular velocity and the one-way clutch is interposed so that only one-directional rotation is transmitted to the third rotary shaft (output shaft). A torque caused by pedaling acts to reduce the relative angle against a biasing force of the spring. Hence, an automatic control mechanism for the angular velocity ratio by the torque is provided.

Upon applying a torque from a pedal crank shaft to the first rotary shaft of the input shaft, the torque is given to the third rotary shaft of the output shaft through the primary and secondary angular velocity modulating means of pairs of non-circular gears belonging to the respective sets and the one-way clutch. When the pedal crank is positioned at an intermediate angle between the upper dead point and the lower dead point, the number of output rotations is reduced by a decrease in relative angle produced by load torque of the output shaft against the biasing force of the spring, whereby the angular velocity ratio of the output shaft with respect to the input shaft is automatically controlled so as to be changed in a continuous stepless manner. When the pedal crank is positioned at an angle in the vicinity of the respective dead points, the angular velocity ratio of the third non-circular gear with respect to the input shaft decreases to 1 or less, the one-way clutch is idle, and the driving power is not transmitted to the output shaft, but the output shaft maintains its rotation by inertia.

The driving apparatus of the present invention may alternatively be provided with an auxiliary sprocket supported by the first rotary shaft through a one-way clutch and with a driving chain stretched across the auxiliary sprocket, output sprocket at the third rotary shaft, and rear wheel sprocket. In such apparatus, when the pedal crank is positioned at an angle in the vicinity of the respective dead points and the angular velocity ratio of the output shaft with respect to the input shaft becomes less than 1, the rotation of input shaft by the pedal crank is transmitted to the auxiliary sprocket due to the existence of auxiliary sprocket and the driving power is transmitted to the output shaft, thereby maintaining the output/input angular velocity ratio of 1. Therefore, the pedal crank is smoothly rotated without rapidly decreasing resistance at an angle in the vicinity of the respective dead points.

The above and further objects and features of the invention will more fully be apparent from the following detailed description with accompanying drawings.

DESCRIPTION OF THE PREFERRED EMBODIMENTS

Figure 1:
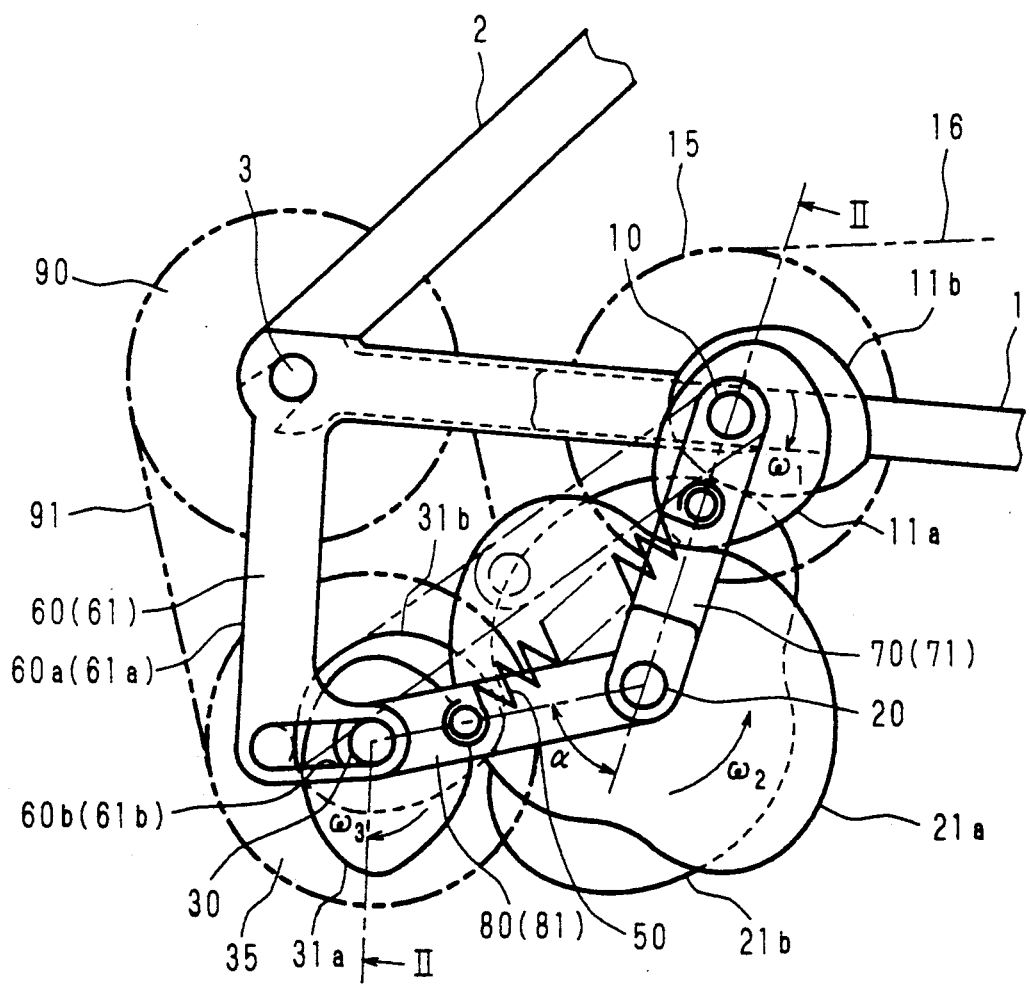
FIG. 1 is a front view of an embodiment of a driving apparatus with a speed changer for a bicycle of the present invention, showing a principal portion thereof.
Figure 2:
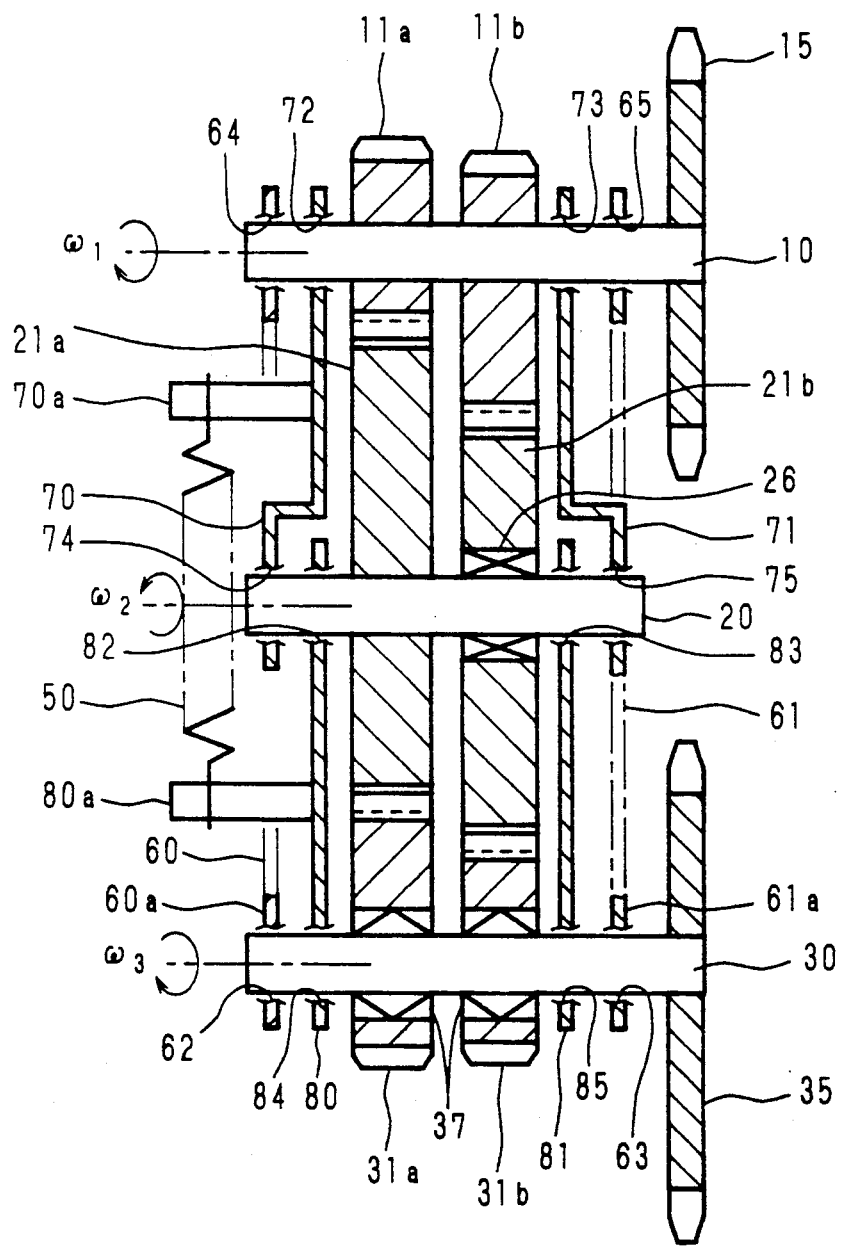
FIG. 2 is a sectional view taken on the line II—II in FIG. 1.

Next, an embodiment of the present invention will be concretely detailed as follows:

FIGS. 1 and 2 show the embodiment of the invention, in which reference numeral 1 designates a bifurcated chain stay at the bicycle frame. A back fork 2 for supporting a rear wheel shaft 3 is fixed to the chain stay 1. References 10, 20 and 30 designate first, second and third rotary shafts respectively. The first rotary shaft 10 fixes a first non-circular gear 11a at a first set and a first non-circular gear 11b at a second set at a phase difference of $\pi/2$ radian. The second rotary shaft 20 fixes a second non-circular gear 21a at the first set and rotatably supports a second non-circular gear 21b at the second set through a bearing 26. The third rotary shaft 30 supports a third non-circular gear 31a at the first set and a third non-circular gear 31b at the second set through bearings with one-way clutch function (to be hereinafter called the bearing with one-way clutch) 37. To the chain stay 1 are fixed a pair of both side fixing frames 60 and 61 integrally coupled with each other at a predetermined interval. The fixing frames 60 and 61 support at the fore end portion thereof the first rotary shaft 10 through bearings 64 and 65, and the third rotary shaft 30 is supported through bearings 62 and 63 in longitudinally elongate holes 60b and 61b provided at one end portions of arms 60a and 61a thereof in relation of being rotatably and movable lengthwise of the holes 60b and 61b. To the first rotary shaft 10 are rotatably supported through bearings 72 and 73 a pair of both side first movable frames 70 and 71 integrally coupled with each other at the predetermined interval. The first movable frames 70 and 71 rotatably support the second rotary shaft 20 through bearings 74 and 75. To the second rotary shaft 20 are rotatably supported through bearings 82 and 83 a pair of both side second movable frames 80 and 81 integrally coupled with each other at a predetermined interval. The second movable frames 80 and 81 rotatably support the third rotary shaft 30 through bearings 84 and 85.

Figure 15:
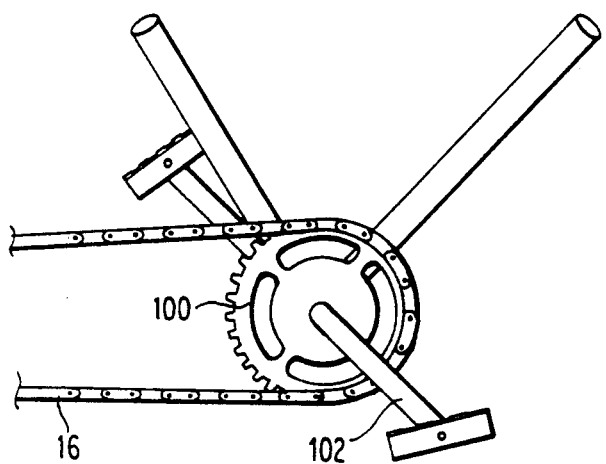
FIG. 15 is a side view of a pedal and driving gear of a bicycle.

An input side sprocket 15 is fixed to the first rotary shaft 10. Drive rotation is transmitted at, for example, an velocity ratio of 2 to the sprocket 15 through a driving chain 16 stretched across the sprocket 15 and a crank sprocket 100 fixed to a pedal crank shaft 102, as shown in FIG. 15. On the other hand, an output side sprocket 35 is fixed to the third rotary shaft 30. Output rotation is transmitted to a rear wheel boss (not shown) supported through a bearing to the rear wheel shaft 3, through a driving chain 91 stretched across the sprocket 35 and a rear wheel sprocket 90 fixed to a freewheel (not shown).

A spring 50 is stretched between a pin 70a at the first movable frame 70 and a pin 80a at the second movable frame 80, which generates a biasing force so as to increase a relative angle $\alpha$ around the second rotary shaft 20 between the first movable frames 70 and 71 and the second movable frames 80 and 81. A variable range of the relative angle $\alpha$ is, for example, 0 through $\pi/3$ radian. When the movable frames 70 and 80 are not subjected to an external force other than the biasing force of the spring 50, the third rotary shaft 30 is pressed to the one front end of elongate holes 62 and 63 at the fixing frames 60 and 61, so that the relative angle $\alpha$ is $\pi/3$ radian. The relative angle $\alpha$ is smaller than $\pi/3$ radian when a load torque is generated against the biasing force of the spring 50 and a force of rotating the movable frames 70 and 71 around the first rotary shaft 10 acts on the frames. When the load torque exceeds a value set by the maximum value of biasing force of spring 50, the third rotary shaft 30 is pressed to the other end of elongate holes 62 and 63, the relative angle $\alpha$ becomes zero. The state of $\alpha=0$ is shown by the chain line in FIG. 1.

In the apparatus constructed as the above-mentioned, the first, second and third rotary shafts 10, 20 and 30, first, second and third non-circular gears 11a, 21a and 31a at the first set, and first and second movable frames 70, 71 and 80, 81, constitute one set of element mechanism for performing the angular velocity modulation of the present invention. The rotary shafts 10, 20 and 30, first, second and third non-circular gears 11b, 21b and 31b at the second set, and first and second movable frames 70, 71 and 80, 81, constitute the other set of element mechanism for performing the angular velocity modulation. At the driving apparatus with the speed changer for the bicycle using such two-set element mechanism, when the first rotary shaft 10 is operated as the input shaft and the third rotary shaft 30 as the output shaft, a value of a portion where a ratio of angular velocity $\omega_3$ obtained by the third rotary shaft 30 with respect to an angular velocity $\omega_1$ given to the first rotary shaft 10 continuously varies in correlation with a value of the relative angle continuously controllable. Next, explanation will be given on regarding the above operation on the basis of a mechanism using the pair of non-circular gears disclosed in the Japanese Patent Application No. 1-92543 by the present applicant.

Figure 3:
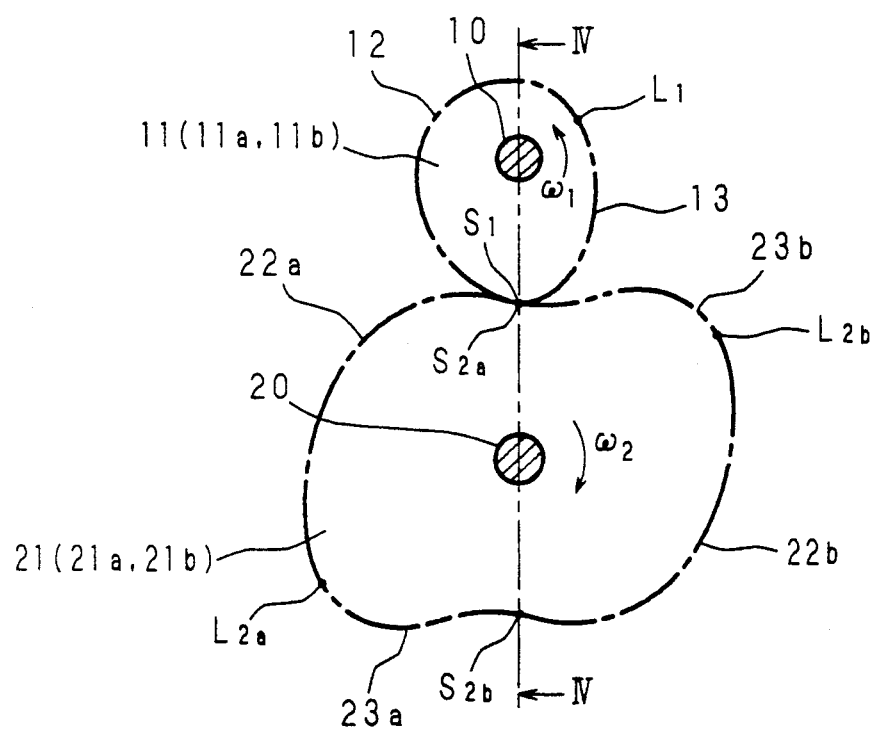
FIG. 3 is a front view showing engagement of first and second non-circular gears.
Figure 4:
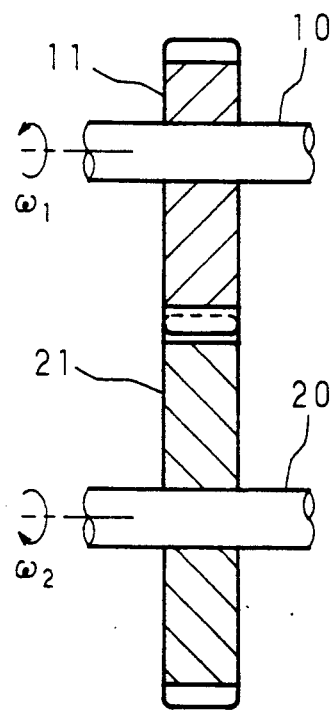
FIG. 4 is a sectional view taken on the line IV—IV in FIG. 3.

FIGS. 3 and 4 show the first non-circular gear 11a (or 11b) and second non-circular gear 21a (or 21b). The first non-circular gear 11 has engaging pitch curves 12 and 13. The pitch curve 12 is formed from the point $S_1$ to that $L_1$, the pitch curve 13 being formed in continuation of the pitch curve 12 from the point $L_1$ to that $S_1$. The second non-circular gear 21 has engaging pitch curves 22a, 23a, 22b, and 23b. The pitch curve 22a is formed from the point $S_{2a}$ to that $L_{2a}$, the pitch curve 23a is formed in continuation of the pitch curve 22a and from the point $L_{2a}$ to that $S_{2b}$, the pitch curve 22b is formed in continuation of the pitch curve 23a from the point $S_{2b}$ to that $L_{2b}$, the pitch curve 23b being formed in continuation of the pitch curve 22b from the point $L_{2b}$ to that $S_{2a}$. The pitch curves 22a and 22b and those 23a and 23b have the same configuration respectively, and the second non-circular gear 21 repeats the same configuration at every central angle of $\pi$ radian. The pitch curves 22a (22b) and 23a (23b) of the second non-circular gear 21 are made equal in total length to those 12 and 13 of first non-circular gear 11. Thus, the total number of teeth of the second non-circular gear 21 is two times that of the first non-circular gear 11.

It should be noted that the involute tooth is provided along each above-mentioned engaging pitch curve. For explanation of rotation speed or transmission torque, it is not necessary that the engaging pitch curve be deemed as the main point, so that in the following drawings, representation of tooth profile will be omitted entirely or partially.

Figure 5:
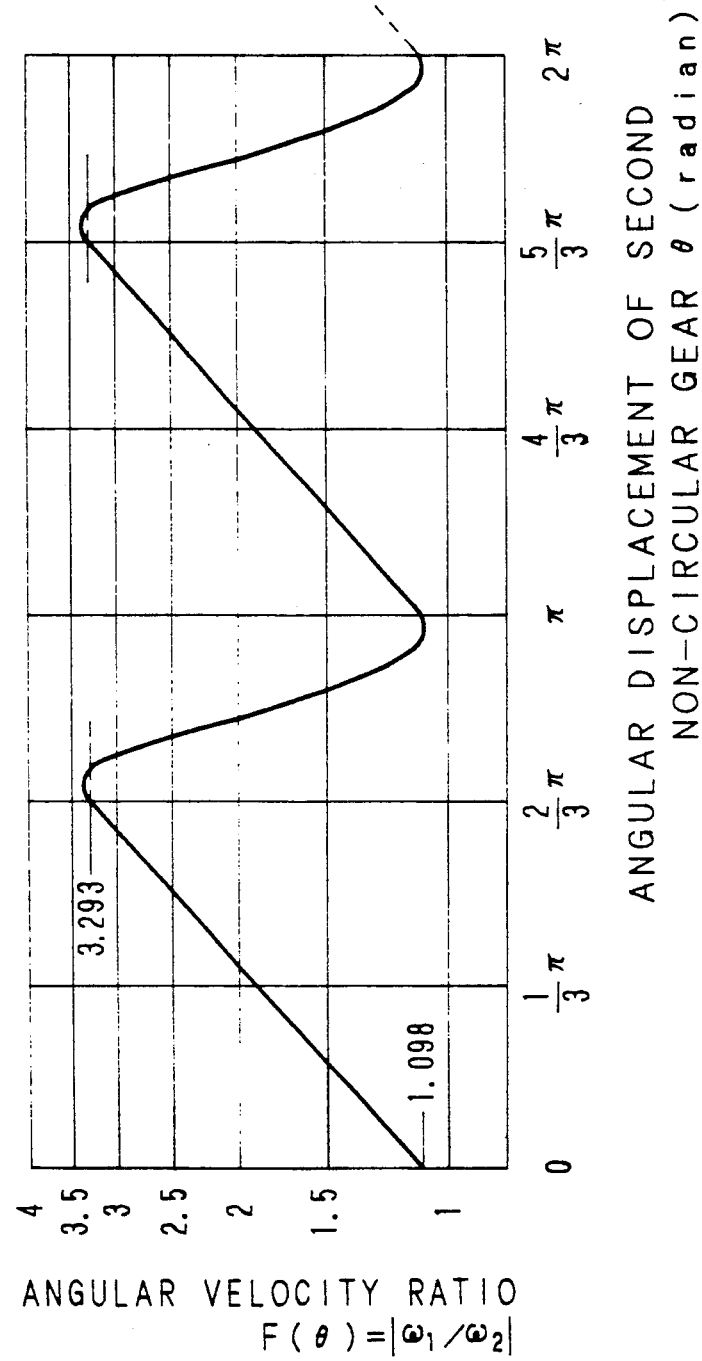
FIG. 5 is a graph showing an angular velocity ration between the first and the second non-circular gears.

The pair of non-circular gears used for the embodiment of the present invention is constructed as mentioned above, the main point of which is characterized in angular velocity to be discussed below. FIG. 5 is a graph showing the relative angular velocity between the first non-circular gear 11 and the second non-circular gear 21, in which the axis of abscissa expresses an angular displacement $\theta$ for one rotation of the second non-circular gear 21 and the state in FIG. 3, that is, the engagement points of the points $S_{2a}$ and $S_1$ are made 0. The ordinate axis expresses in logarithm scale an angular velocity ratio for first non-circular gear 11 with respect to the second non-circular gear 21. When the angular velocity of first non-circular gear 11 is represented by $\omega_1$ and that of the second non-circular gear 21 by $\omega_2$ as a function of $\theta$, $F(\theta)=|\omega_1/\omega_2|$ represents an angular velocity ratio between the first non-circular gear 11 and the second non-circular gear 21. In the FIG. 5, a portion in a range of $\theta=0$ to $\theta=\frac{2}{3}\pi$ and shown by the rightwardly upward line indicates the progress that the second non-circular gear 21 rotates by $\frac{2}{3}\pi$ radian from the state in FIG. 3 to transfer from engagement at the points $S_{2a}$ and $S_1$ to that at the points $L_{2a}$ and $L_1$, which portion is called a main mode portion. Next, a curved portion in a range of $\theta=\frac{2}{3}\pi$ to $\theta=\pi$ and in continuation of the rightwardly upward line indicates the progress that the second non-circular gear 21 further rotates by $\frac{1}{3}\pi$ radian from engagement at the points $L_{2a}$ and $L_1$ to that at the points $S_{2b}$ and $S_1$, which curved portion is called a return mode portion. Thus, until now, the first non-circular gear 11 rotates once and the second non-circular gear 21 rotates one half revolution from the state in FIG. 3. When the first non-circular gear 11 rotates on addition turn a value of $F(\theta)$ on the FIG. 5 graph changes the same as in the above description, and the gears return to the engagement state in FIG. 3. Thus, the angular velocity ratio $F(\theta)$ periodically varies while repeating the main mode portion and return mode portion. The main mode portion is characterized in that the logarithmic value of angular velocity ratio $F(\theta)$ is changed by primary proportion with respect to the angular displacement $\theta$ of second non-circular gear 21. When the example in FIG. 5 is algebraically shown, a differential value K given in $K=d \log F(\theta)/d\theta$ indicates a constant value. In this embodiment, K is 0.52455 radian $^{-1}$.

The return mode portion between the main mode portions periodically appears and serves to smoothly connect the adjacent main mode portions with each other. On the graph of angular velocity ratio in FIG. 5, the curve showing the return mode portion smoothly connects at its start point and termination with the straight line the main mode portion, the angular velocity ratio $F(\theta)$ continuously varies and is differentiable in all aspects from the main mode and return mode portions. In this embodiment, the curve of varying a radius vector length in sine curve with respect to the central angle is used as the engaging pitch curve at the return mode portion of second non-circular gear 21, the angular velocity ratio $F(\theta)$ of return mode portion being introduced from the engaging pitch curve, which, when algebraically represented, in that, when the radius vector length showing the pitch curve at return mode portion of the second non-circular gear 21 is represented by $r(\theta)$ as the function of $\theta$, $r(\theta)$ is obtained by $r(\theta)=J_1\cdot\sin(J_2\cdot\theta+J_3)+J_4$, where values of factors, $J_1$, $J_2$, $J_3$ and $J_4$ are set so that the pitch curve at the return mode portion may be smoothly connected to the pitch curve at the main mode portion. The engaging pitch curve of first non-circular gear 11 is introduced from configuration of the pitch curve of second non-circular gear 21 through the rolling contact condition.

Figure 6:
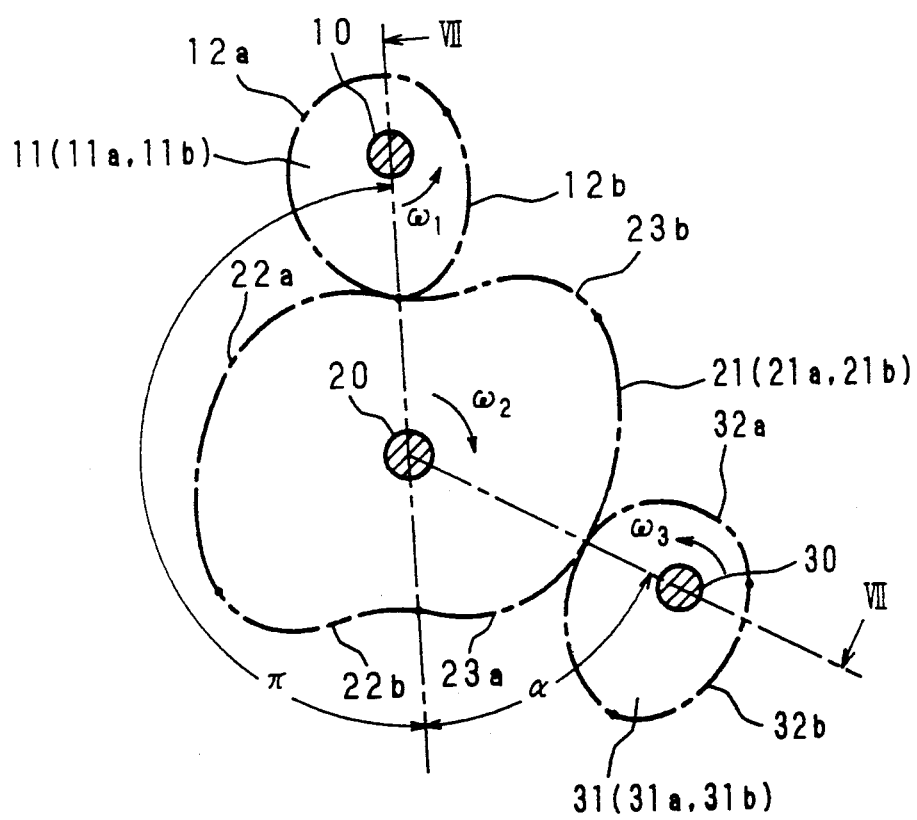
FIG. 6 is a front view of engagement of the first, second and third non-circular gears with each other.
Figure 7:
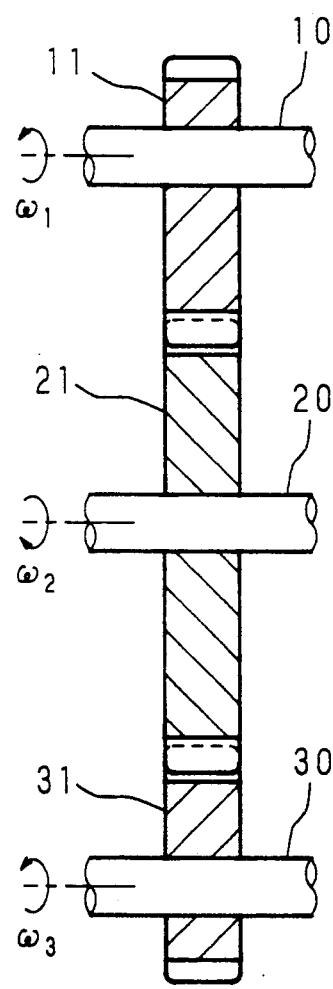
FIG. 7 is a sectional view taken on the line VII—VII in FIG. 6.

Next, explanation will be given on an exemplary angular velocity modulation capable of being introduced from the above-mentioned characteristics of the angular velocity ratio of a pair of non-circular gears. FIGS. 6 and 7 show an element mechanism for operating angular velocity modulation for the embodiment shown in FIGS. 1 and 2, in which the relation of adding a third non-circular gear 31 of the same configuration as the first non-circular gear 11 to the first and second non-circular gears 11 and 21 shown in FIGS. 3, 4 and 5. Herein, engagement of the first non-circular gear 11 and the second non-circular gear 21 is called the primary angular velocity modulating means and that of the second non-circular gear 21 and the third non-circular gear 31 is called the secondary angular velocity modulating means. The primary angular velocity modulating means serves to determine a ratio of angular velocity $\omega_1$ of first rotary shaft 10 to that $\omega_2$ of second rotary shaft 20, which ratio is called the primary angular velocity ratio. Similarly, the secondary angular velocity modulating means serves to determine a ratio of angular velocity $\omega_3$ of third rotary shaft 30 to that $\omega_2$ of second rotary shaft 20, which ratio is called the secondary angular velocity ratio. The secondary angular velocity modulating means is solely applicable to the description in FIGS. 3, 4 and 5 as the same as the primary angular velocity modulating means is described in FIGS. 3, 4 and 5. However, it is to be noted that, as shown in FIG. 6, the third rotary shaft 30 is positioned at a central angle of $(\pi+\alpha)$ radian between the same and the first rotary shaft 10 on the basis of the position of second rotary shaft 20. Since the second non-circular gear 21 repeats the same configuration at every central angle of $\pi$ radian, the $(\pi+\alpha)$ radian is equivalent to that of substantial $\alpha$ radian. When angular velocities of first, second and third non-circular gears 11, 21 and 31 are represented by $\omega_1$, $\omega_2$ and $\omega$ respectively and functions thereof are given in algebraic notation, $$\omega_1 = -\omega_2 \cdot e^{K\cdot\theta} \cdot F(0), \text{ and}$$

$$\omega_3 = -\omega_2 \cdot e^{K\cdot(\theta+\alpha)} \cdot F(0)$$

are obtained, where $F(0)$ is a value of angular velocity ratio $F(\theta)$ when $\theta=0$. From both the expressions, the expression of angular velocity ratio is obtained as follows:

$$\omega_3/\omega_1 = e^{K\cdot\alpha}$$

This last expression shows a property applicable to a stepless speed changer obtained by applying the non-circular gears, the property appearing when the first non-circular gear 11 engages with the second non-circular gear 21 and also the second non-circular gear 21 engages with the third non-circular 31 at the main mode portion. Other than that, an angular velocity ratio pattern determined regarding the angular velocity ratio of return mode portion appears.

Figure 8:
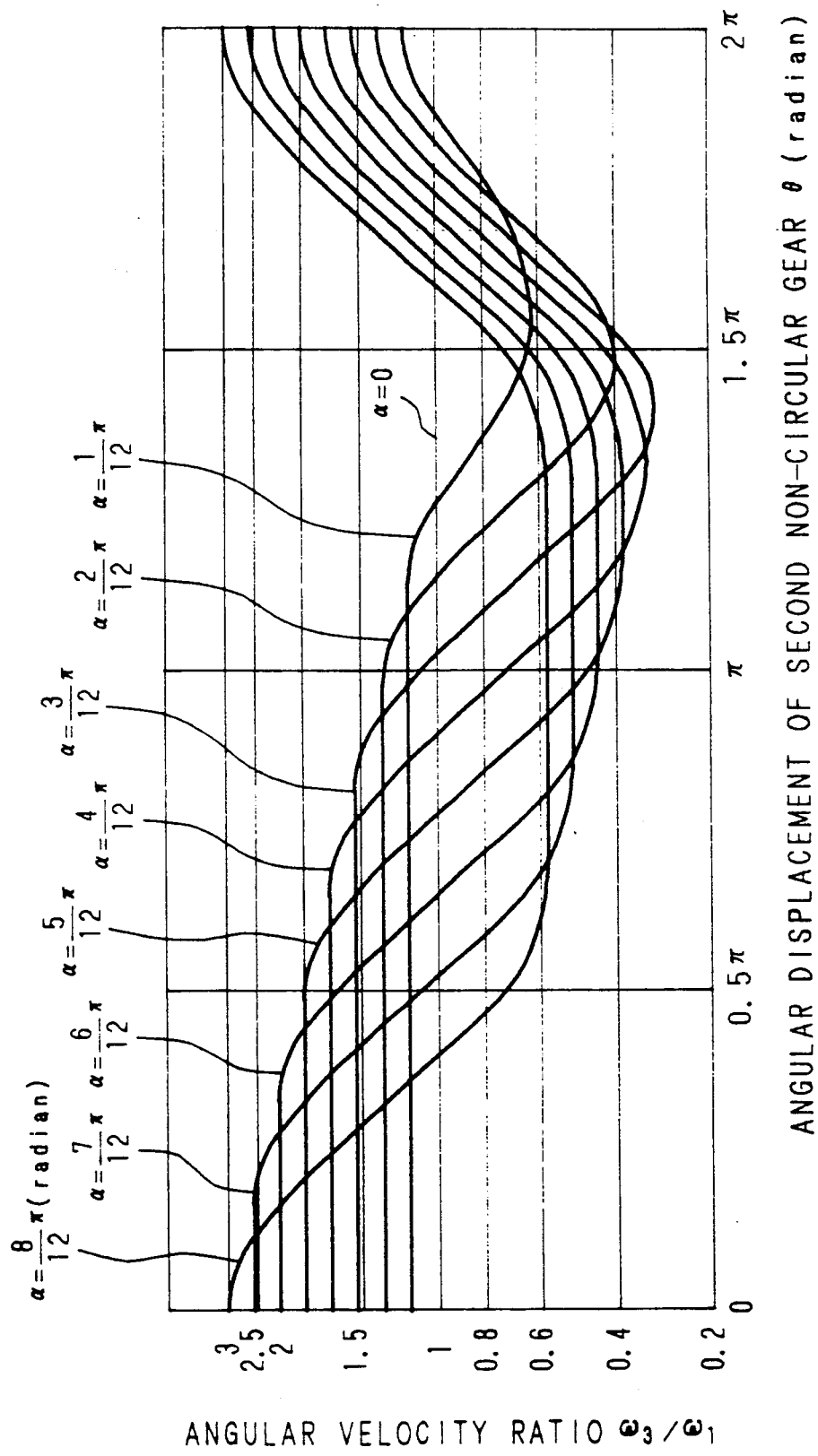
FIG. 8 is a graph showing angular velocity ratios between the first and the third non-circular gears.
Figure 9:
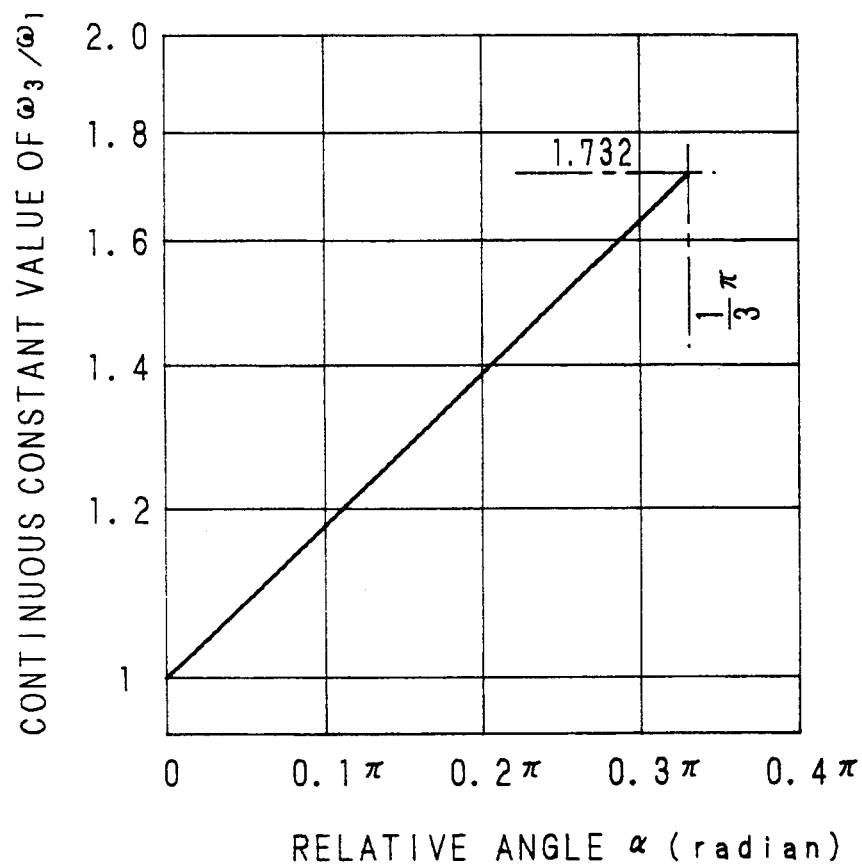
FIG. 9 is a graph showing the relation between the continuous constant value of angular velocity ratio and the relative angle.

When the relative angle $\alpha$ showing the position of third non-circular gear 31 is given as a variable value with respect to the first non-circular gear 11 shown in FIG. 6, variation in angular velocity ratio $\omega_3/\omega_1$ between both the gears is shown in FIG. 8, in which the continuous constant value appears in angular velocity ratio and changes in correlation with a value of $\alpha$ at combination applying the pair of non-circular gears. FIG. 9 is a characteristic view showing the relation between the continuous constant value and the relative angle $\alpha$.

In this embodiment, two sets of element mechanism for operating the above-mentioned angular velocity modulation are used to continuously utilize a range in which the continuous constant angular velocity ratio of each set appears. Herein, it is posible to combine a large number of element mechanism ot completely continue the ranges of showing the continuous constant speed for the use, but at the speed changer of the embodiment, from the relation of pedal crank phase angle contributing to power transmission, two sets of element mechanism are used not to complicate the entire apparatus. Next, explanation will be given on this matter.

Generally, the driving power for the bicycle depends on strength of human leg. From construction of the pedal and crank now in use, when the pedal is in phase in front of the crank shaft, the strength of leg is the most efficient, but when the pedal is at the other positions, it is scarcely or not at all used for transmitting the driving power. Therefore, when the phase required to transmit the driving power by the crank is assumed to be in a range of an angle of 90° of each 45° at both sides of the foremost position of rotating pedal, the angular velocity need only be efficiently modulated in this range. When the phase of crank pedal is other than the above, the crank is in the state of nonpower transmission provided by the bearings with one-way clutch 37, wherein when a ratio of number of teeth of the crank sprocket integrally rotatable with the crank to that of the input side sprocket 15 is an integer ratio, the relation between the phase of crank sprocket and that of sprocket 15 is fixable. In this embodiment, when the crank sprocket rotates at angle of 90°, the sprocket 15 is adapted to rotate at 180° and also the relation between the phase of crank and that of first rotary shaft 10 is not changed. In other words, the continuous constant angular velocity ratio need only be obtained in a range of rotation angle of 180° of the first rotary shaft 10. In this embodiment, the aforesaid two sets of element mechanisms are used to obtain $\pi/3$ as the upper limit of relative angle $\alpha$ when the constant angular velocity continues at 180° or more, so that the angular velocity ratio of the third rotary shaft 30 with respect to the first rotary shaft 10 in the constant angular velocity range is adapted to change from 1 to 1.73.

The method of connecting the continuous constant angular velocity ratios of two sets of element mechanisms fixes the first non-circular gears 11a and 11b which are given a rotary phase difference of $\pi/2$ radian respectively, and uses the bearings with one-way clutch 37.

When a value of $\omega_3/\omega_1$ from the first set of element mechanisms is represented by a function $G_1(\theta)$ and that of the second set of element mechanisms is represented by a function $G_2(\theta)$, the expression: $G_2(\theta)=G_1(\theta-\beta)$ can be obtained, in which $\beta$ designates the phase angle difference between the second non-circular gears 21a and 21b on the second rotary shaft 20 corresponding to the phase angle difference $\pi/2$ given to the first non-circular gears 11a and 11b on the first rotary shaft 10 the maximum value $\beta$max in FIG. 1 embodiment is 0.333 radian. In a range where a condition of $\alpha \leq \beta$max is satisfied, the continuous constant value of $\omega_3/\omega_1$ can successively appear, wherein the bearings with one-way clutch 37 are set to enable the driving power to be transmitted from the third non-circular gears 31a and 31b only to the third rotary shaft 30 in the rotation direction shown in the drawing, and among the rotations of two sets of third non-circular gears 31a and 31b, only a high value of angular velocity ratio contributes to the rotation of third rotary shaft 30, but a low value does not.

Figure 10:
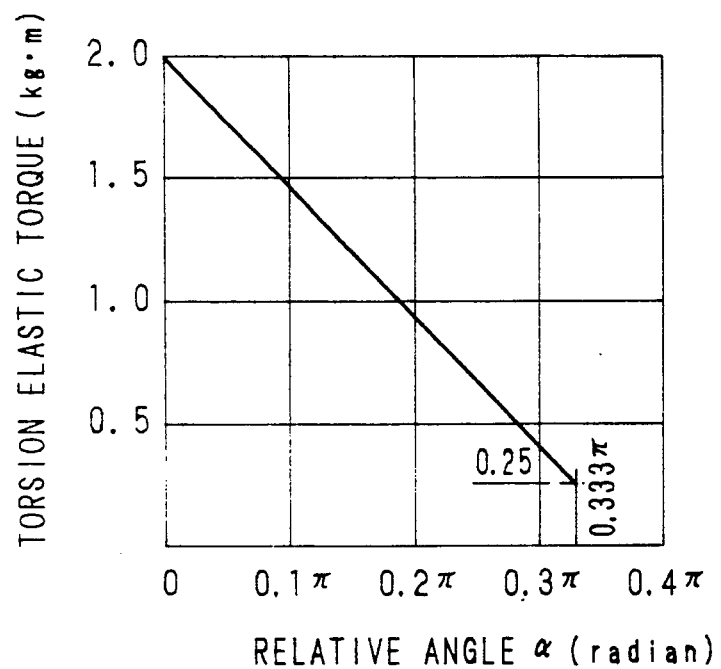
FIG. 10 is a graph showing the relation between the relative angle and a torsion elastic torque of a spring.
Figure 11:
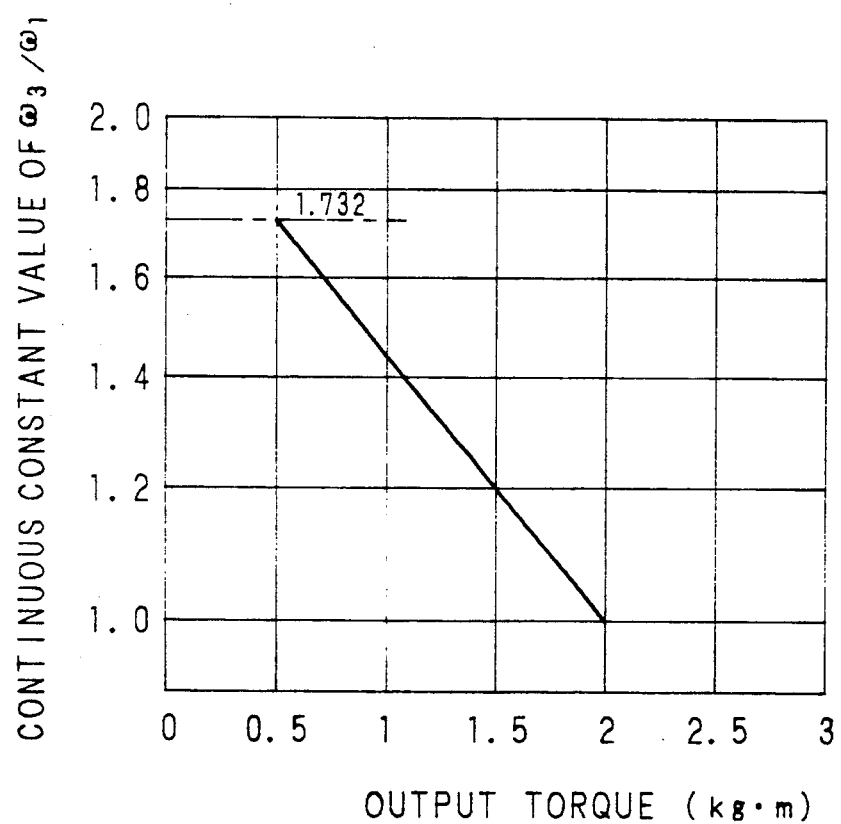
FIG. 11 is a graph showing the relation between an output torque and an output/input angular velocity ratio.

FIG. 10 is a graph of an embodiment of characteristic of (torsion elastic torque)/(torsional angle) given for the spring 50. The torsion elastic torque is in a dynamic equilibrium condition so that the output/input angular velocity ratio characteristic by the input torque or output torque is set by the torsion elastic characteristic. FIG. 11 is a graph showing control characteristics.

Figure 12:
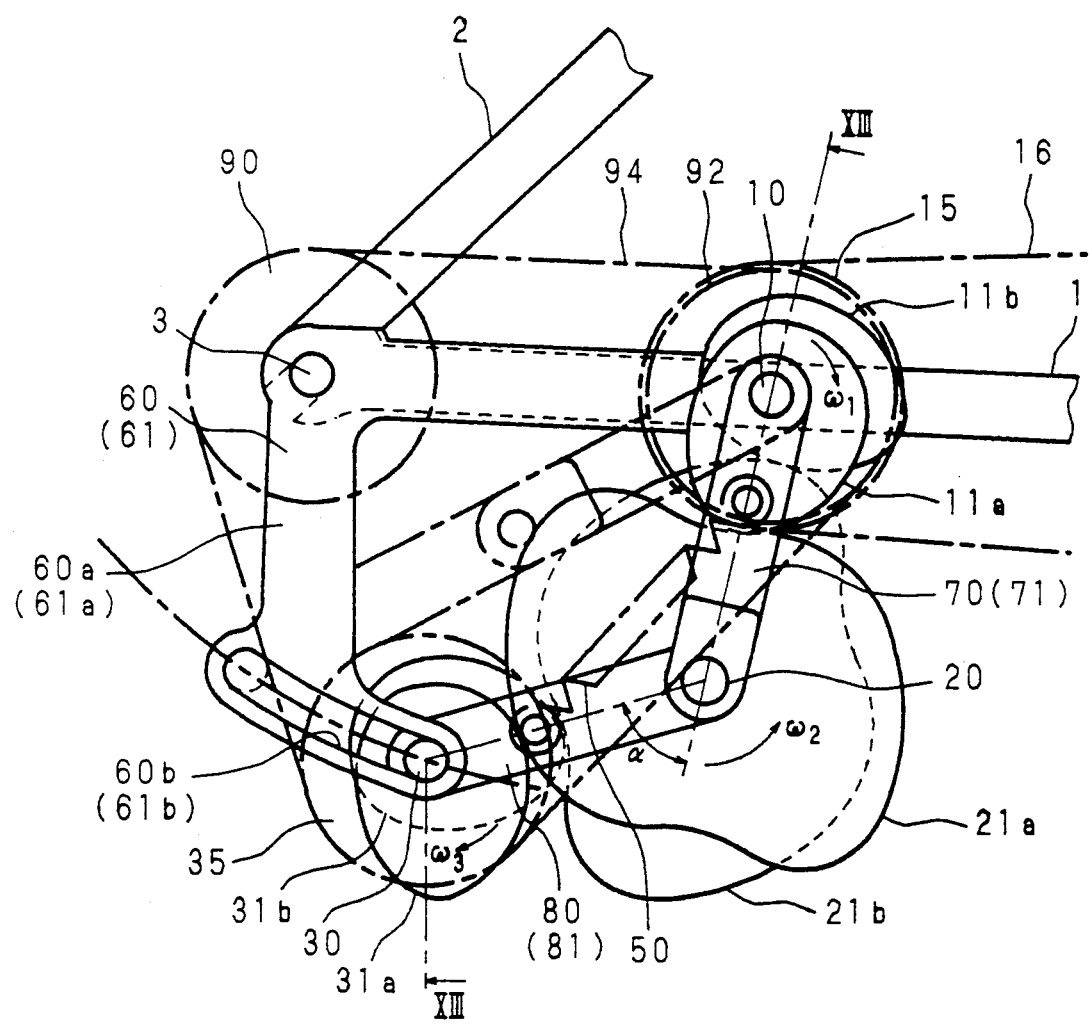
FIG. 12 is a front view of the principal portion of a modified embodiment of the driving apparatus with the speed changer for the bicycle of the invention.
Figure 13:
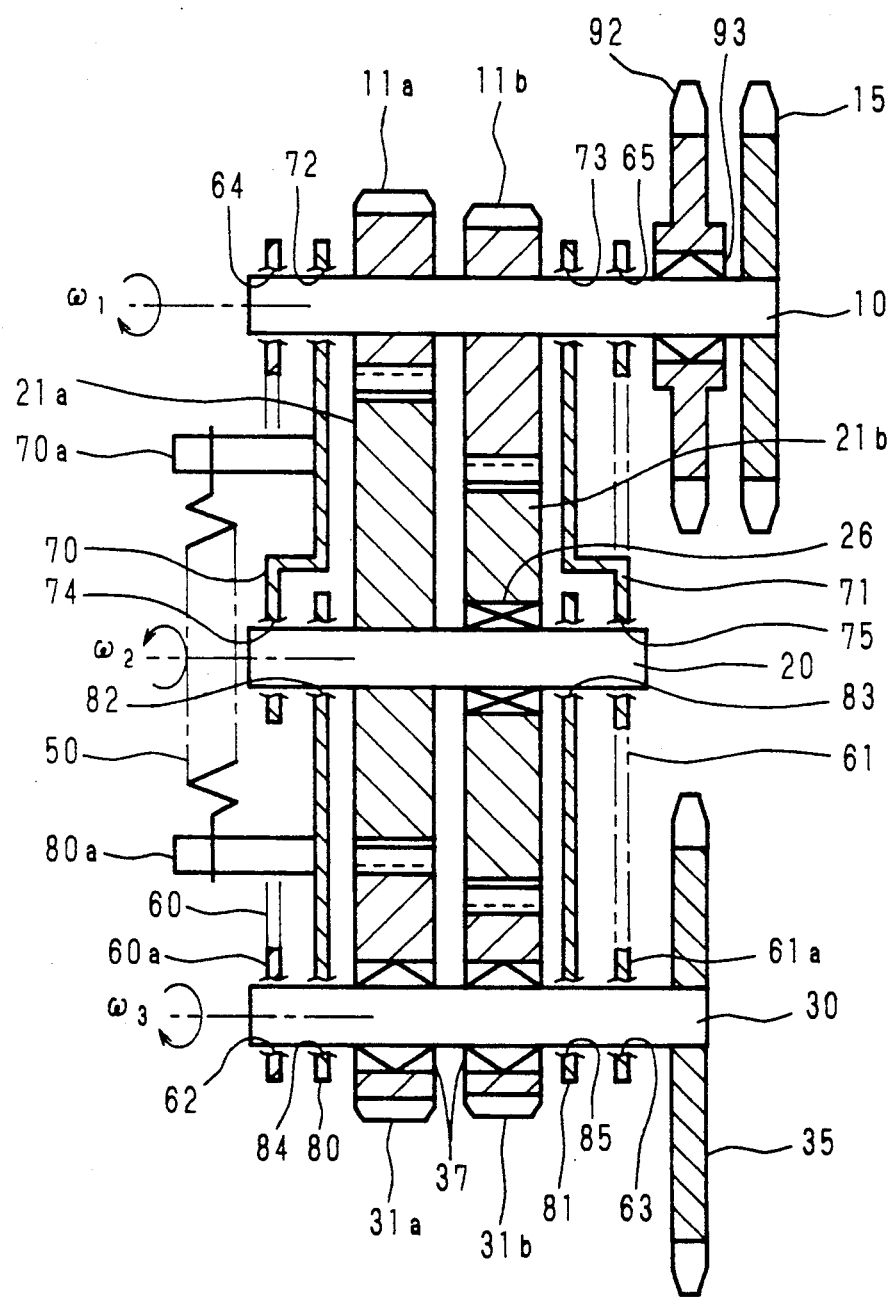
FIG. 13 is a sectional view taken on the line XIII—XIII in FIG. 12.

A modified embodiment of a driving apparatus with a speed changer for a bicycle of the present invention is shown in FIGS. 12 and 13, in which the components designated by the same reference numerals as those in FIGS. 1 and 2 show the same components and explanation thereof is omitted. To the first rotary shaft 10 is supported an auxiliary sprocket 92 through a bearing with one-way clutch 93. An endless chain 94 is stretched across the auxiliary sprocket 92, the output side sprocket 35, and the rear wheel sprocket 90.

Figure 14:
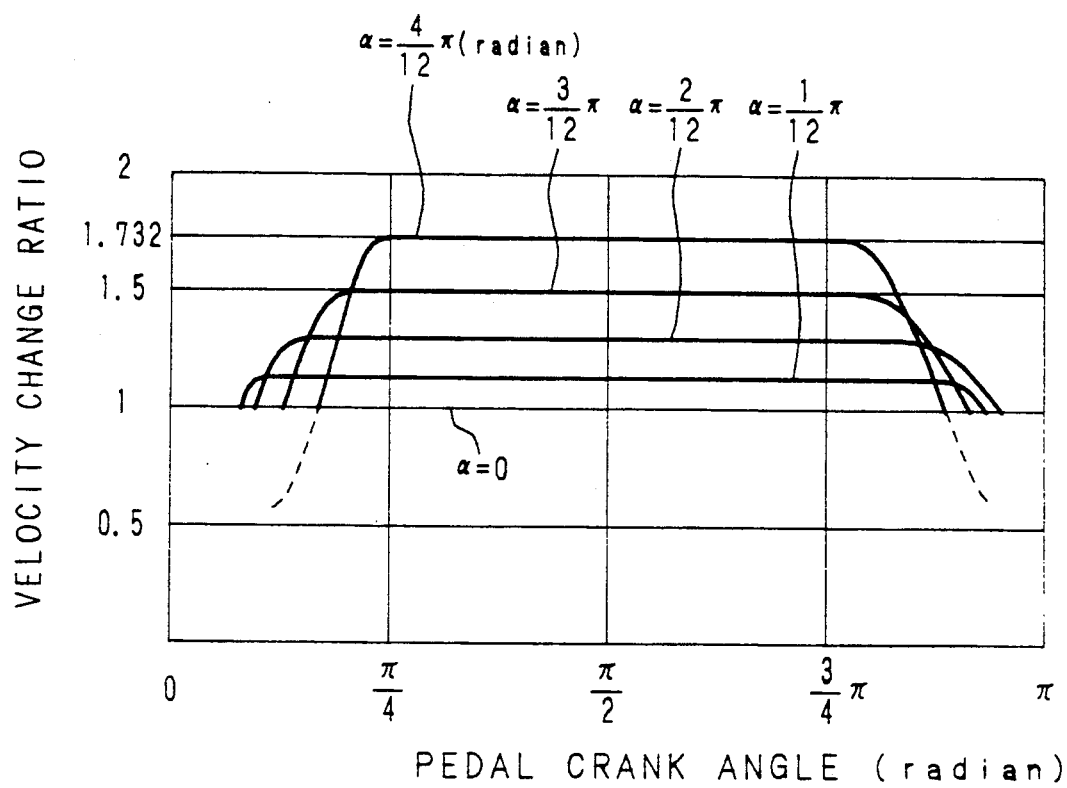
FIG. 14 is a graph showing a pattern of variation in a velocity change ratio with respect to a pedal crank angle.

FIG. 14 shows the relation between the pedal crank angle and the velocity change ratio, in which it is seen that at both sides of the pedal crank angle of $\pi/2$, in other words, when the pedals are positioned horizontally, the constant portion appears at the velocity change ratio of 1 or more. When other than $\alpha=0$, partially shown by the dotted line in FIG. 14, ranges of velocity change ratio less than 1 is produced by the angular velocity modulation, at which time the bearing with one-way clutch 93 operates to transmit the driving power from the first rotary shaft 10 directly to the rear wheel sprocket 90 through the auxiliary sprocket 92 and chain 94, so that the angular velocity modulating element mechanisms of non-circular gears do not contribute to power transmission and the bearings with one-way clutch 37 are in a slip condition. Accordingly, the range of angular velocity ratio of 1 or less of element mechanisms corresponds to the range of velocity change ratio of 1 in FIG. 14.

In this modified embodiment, in an angular range in which the pedal crank transmit the driving power, velocity change ratio becomes 1 or more from the sprocket 15 and the first rotary shaft 10 through the angular velocity modulating element mechanisms, so that the third rotary shaft 30 rotatably accelerates to transmit the rotation to the rear wheel sprocket 90, at which time the auxiliary sprocket 92 also is rotatably accelerated, through the chain 94, but idles with respect to the first rotary shaft 10 because the bearing with one-way clutch 93 is interposed. In an angular range in which the pedal crank is positioned in the vicinity of the dead points, the driving power for the sprocket 15 is eliminated and the angular velocity ratio of first rotary shaft (input shaft) 10 to the third rotary shaft (output shaft) 30 is intended to be 1 or less. At such state, resistance against pedaling rapidly decreases and the pedaling gives no driving power for one rotation so as to be in a rapid rotation range, thereby lacking smooth transmission. In this state, however, since the driving power is transmitted from the first rotary shaft 10 to the auxiliary sprocket 92 through the bearing with one-way clutch 93, resistance against pedaling is generated, thereby smoothing the pedaling.

In addition, the configuration of the non-circular gear at the element mechanism for angular velocity modulation is not restated to that shown in FIG. 3, but when the gear performs the exponential function angular velocity modulation, any configuration may be used in place of that in FIG. 3.

Alternatively, the number of element mechanisms is not limited to the two sets, so that the number of element mechanisms may be increased in order to expand the angular range of constant velocity or expand the velocity change ratio.

Furthermore, in the above-mentioned embodiments the spring 50 aims at giving a torque to the first movable frames 70 and 71 and second movable frames 80 and 81 so as to increase the relative angle $\alpha$. If such object is attained, any other component may be applied to construction or operation of the spring 50.

Alternatively, in the above-mentioned embodiments, the bearings with one-way clutch 37 are interposed between the third non-circular gears 31a and 31b and the third rotary shaft 30, for arranging the direction of transmitting the power, the bearings with one-way clutch may be interposed between the first non-circular gears 11a and 11b and the first rotary shaft 10 and the third non-circular gears 31a and 31b may be fixed to the third rotary shaft 30 with a different phase respectively.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A driving apparatus provided with a speed changer, for driving a bicycle, comprising:
    a first rotary shaft receiving input driving power;
    a second rotary shaft;
    a third rotary shaft generating output driving power;
    at least one primary angular velocity modulating means, having a first non-circular gear fixed to said first rotary shaft and a second non-circular gear supported by said second rotary shaft, for performing a first exponential function angular velocity modulation;
    at least one secondary angular velocity modulating means, having said second non-circular gear and a third non-circular gear supported by said third rotary shaft through a one-way clutch, for performing a second exponential function angular velocity modulation; and
    a spring member for generating an oblique biasing force intersecting first and second lines defined by said first rotary shaft and said second rotary shaft and said second rotary shaft and said third rotary shaft, respectively, so that a relative angle between said first rotary shaft and said third rotary shaft around said second rotary shaft increases.

2. A driving apparatus with a speed changer for a bicycle according to claim 1, wherein a plurality of sets of said primary angular velocity modulating means and said secondary angular velocity modulating means are provided respectively.

3. A driving apparatus with a speed changer for a bicycle according to claim 2, wherein each first non-circular gear in said plurality of sets of said primary angular velocity modulating means is fixed to said first rotary shaft with a different phase respectively.

4. A driving apparatus with a speed changer for a bicycle according to claim 1, further comprising:
    a first movable frame which is rotatably supported at one end portion thereof by said first rotary shaft through a bearing and which rotatably supports at the other end portion said second rotary shaft through a bearing; and
    a second movable frame which is rotatably supported at one end portion thereof by said second rotary shaft through a bearing and which rotatably supports at the other end portion said third rotary shaft through a bearing.

5. A driving apparatus with a speed changer for a bicycle according to claim 4, wherein said spring member is mounted across said first movable frame and said second movable frame.

6. A driving apparatus with a speed changer for a bicycle according to claim 1, further comprising a fixing frame supporting at one end portion thereof said first rotary shaft through a bearing and provided at the other end portion with an elongate hole.

7. A driving apparatus with a speed changer for a bicycle according to claim 6, wherein said fixing frame supports said third rotary shaft in said elongate hole in relation of being movable lengthwise of said elongate hole.

8. A driving apparatus with a speed changer for a bicycle according to claim 1, further comprising:
    first transmission means for transmitting a torque from a pedal crank shaft to said first rotary shaft; and
    second transmission means for transmitting a torque from said third rotary shaft to a rear wheel shaft.

9. A driving apparatus with a speed changer for a bicycle according to claim 1, wherein an angular velocity ratio of said third rotary shaft with respect to said first rotary shaft is set to $e^{K \cdot \alpha}$ where $\alpha$ represents the relative angle and K represents a speed modulation factor.

10. A driving apparatus with a speed changer for a bicycle according to claim 9, wrein an angular velocity ratio of a rear wheel shaft with respect to a pedal crank shaft is constant in a range of at least 90° as to a half rotation of said pedal crank shaft.

11. A driving apparatus with a speed changer for a bicycle according to claim 1, further comprising:
    an input sprocket fixed to said first rotary shaft;
    an output sprocket fixed to said third rotary shaft; and
    a rear wheel sprocket fixed to a rear wheel shaft.

12. A driving apparatus with a speed changer for a bicycle according to claim 11, further comprising:
    an auxiliary sprocket supported to said first rotary shaft through a one-way clutch; and a driving chain stretched across said auxiliary sprocket, said output sprocket and said rear wheel sprocket.

13. A driving apparatus with a speed changer for a bicycle, comprising:
   a first rotary shaft receiving input driving power;
   a second rotary shaft;
   a third rotary shaft generating output driving power;
   at least one primary angular velocity modulating means, having a first non-circular gear fixed to said first rotary shaft and a second non-circular gear supported by said second rotary shaft, for performing a first exponential function angular velocity modulation;
   at least one secondary angular velocity modulating means, having said second non-circular gear and a third non-circular gear supported by said third roary shaft through a one-way clutch, for performing a second exponential function angular velocity modulation;
   a spring member for generating a biasing force so that a relative angle between said first rotary shaft and said third rotary shaft around said second rotary shaft increases;
   a first movable frame whic his rotatably supported at one end portion thereof by said first rotary shaft through a bearing and which rotatably supports at the other end portion said second rotary shaft through a bearing; and
   a second movable frame which is rotatably supported at one end portion thereof by said second rotary shaft through a bearing and which rotatably supports at the other end portion said third rotary shaft through a bearing.

14. A driving apparatus with a speed changer for a bicycle according to claim 13, wherein said spring member is mounted across said first movable frame and said second movable frame.

15. A driving apparatus with a speed changer for a bicycle, comprising:
   a first rotary shaft receiving input driving power;
   a second rotary shaft;
   a third rotary shaft generating output driving power;
   at least one primary angular velocity modulating means, having a first non-circular gear fixed to said first rotary shaft and a second non-circular gear supported by said second rotary shaft, for performing a first exponential function angular velocity modulation;
   at least one secondary angular velocity modulating means, having said second non-circular gear and a third non-circular gear supported by said third rotary shaft through a one-way clutch, for performing a second exponential function angular velocity modulation;
   a spring member for generating a biasing force so that a relative angle between said first rotary shaft and said third rotary shaft around said second rotary shaft increases; and
   a fixing frame supporting at one end portion thereof said first rotary shaft through a bearing and provided at the other end portion with an elongate hole.

16. A driving apparatus with a speed changer for a bicycle according to claim 15, wherein said fixing frame supports said third rotary shaft in said elongate hole in relation of being movable lengthwise of said elongate hole.

17. A driving apparatus with a speed changer for a bicycle, comprising:
   a first rotary shaft receiving input driving power;
   a second rotary shaft;
   a third rotary shaft generating output driving power;
   at least one primary angular velocity modulating means, having a first non-circular gear fixed to said first rotary shaft and a second non-circular gear supported by said second rotary shaft, for performing a first exponential function angular velocity modulation;
   at least one secondary angular velocity modulating means, having said second non-circular gear and a third non-circular gear supported by said third rotary shaft through a one-way clutch, for performing a second exponential function angular velocity modulation;
   a spring member for generating a biasing force so that a relative angle between said first rotary shaft and said third rotary shaft around said second rotary shaft increases;
   first transmission means for transmitting a torque from a pedal crank shaft to said first rotary shaft; and
   second transmission means for transmitting a torque from said third rotary shaft to a rear wheel shaft.

18. A driving apparatus with a speed changer for a bicycle, comprising:
   a first rotary shaft receiving input driving power;
   a second rotary shaft;
   a third rotary shaft generating output driving power;
   at least one primary angular velocity modulating means, having a first non-circular gear fixed to said first rotary shaft and a second non-circular gear supported by said second rotary shaft, for performing a first exponential function angular velocity modulation;
   at least one secondary angular velocity modulating means, having said second non-circular gear and a third non-circular gear supported by said third rotary shaft through a one-way clutch, for performing a second exponential function angular velocity modulation;
   a spring member for generating a biasing force so that a relative angle between said first rotary shaft and said third rotary shaft around said second rotary shaft increases;
   wherein an angular velocity ratio of said third rotary shaft with respect to said first rotary shaft is set to $e^{k \cdot \alpha}$ where $\alpha$ represents the relative angle and K represents a speed modulation factor; and
   wherein an angular velocity ratio of a rear wheel shaft with respect to a pedal crank shaft is constant in a range of at least 90° as to a half rotation of said pedal crank shaft.

19. A driving apparatus with a speed changer for a bicycle, comprising:
   a first rotary shaft receiving input driving power;
   a second rotary shaft;
   a third rotary shaft generating output driving power;
   at least one primary angular velocity modulating means, having a first non-circular gear fixed to said first rotary shaft and a second non-circular gear supported by said second rotary shaft, for performing a first exponential function angular velocity modulation;
   at least one secondary angular velocity modulating means, having said second non-circular gear and a third non-circular gear supported by said third rotary shaft through a one-way clutch, for performing a second exponential function angular velocity modulation, a spring member for generating a biasing force so that a relative angle between said first rotary shaft and said third rotary shaft around said second rotary shaft increases;

an input sprocket fixed to said first rotary shaft;

an output sprocket fixed to said third rotary shaft; and a rear wheel sprocket fixed to a rear wheel shaft.

* * * * *